(No Model.)
I. RIGDON.
SCALE BEAM.
No. 271,274. Patented Jan. 30, 1883.
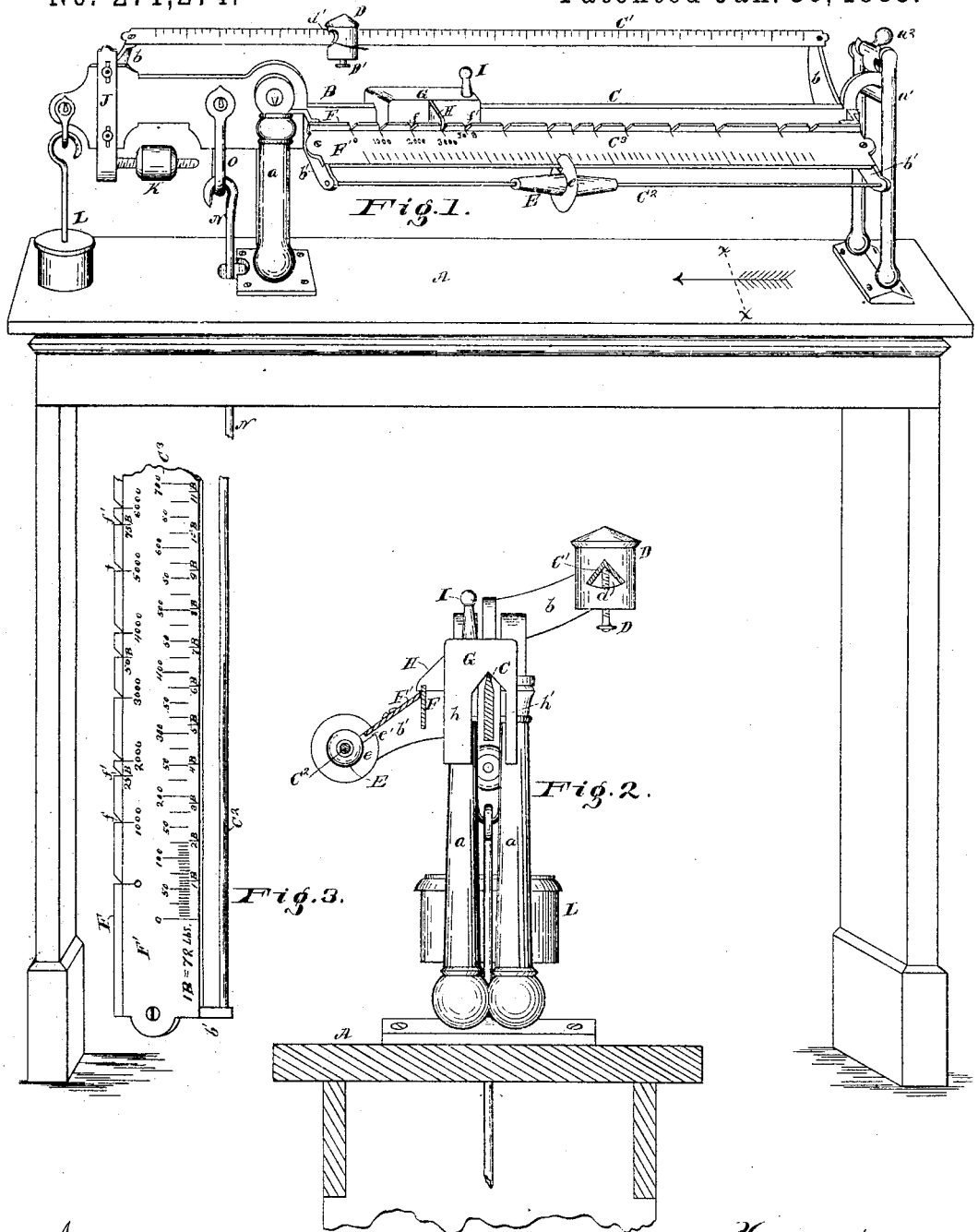
Attest:
E. R. Hill
J. Wm. Strehli
Inventor:
Isaac Rigdon
per Wm. Hubbell Fisher,
Atty

UNITED STATES PATENT OFFICE.

ISAAC RIGDON, OF CINCINNATI, OHIO.

SCALE-BEAM.

SPECIFICATION forming part of Letters Patent No. 271,274, dated January 30, 1883.

Application filed July 10, 1882. (No model.)

*To all whom it may concern:*

Be it known that I, ISAAC RIGDON, of the city of Cincinnati, county of Hamilton, and State of Ohio, have invented certain new and useful Improvements in Scale-Beams, of which the following is a specification.

My invention is more particularly applicable to large platform-scales, such as are used for weighing coal or grain, and on which it is at times desirable to weigh pounds and at other times to weigh bushels but certain features of my invention may, however, be advantageously employed for smaller scales, such as warehouse or counter scales.

One feature of my invention relates to the position and relation of the various beams and indexes for weighing pounds or bushels, and another feature relates to the formation and construction of the various weights. In the present instance, for the purpose of illustration, I have shown my invention as constructed for application to scales for weighing coal.

Referring to the drawings forming part of this specification, Figure 1 is a perspective view of my invention. Fig. 2 is a transverse section taken in the vertical plane of the line $x\ x$ on Fig. 1, and looking in the direction of the arrow. Fig. 3 is an enlarged view of a portion of the main beam.

A is the table or platform for supporting the beam. Secured to the top of this table is the double pillar or support $a$, in the upper end of which is fulcrumed the scale-beam B, the usual knife-edge fulcrum-points being used to secure greater accuracy. The long arm of the scale-beam, when depressed by the weight, is supported by the pillars $a'$, the upper ends of which are provided with a weighted pawl, $a^2$, to prevent any vibration of the beam when the scale is not in use.

The beam B consists of the main beam C, the tare-beam C', the light-weight beam C², and the index-beam C³, the three latter being placed, as shown, at the sides of the main beam C, and parallel thereto, and connected to said main beam by the brackets or arms $b$ $b'$. The tare-beam C' is made of an inverted-V shape, as shown in Fig. 2, presenting an inclined surface to the eye of the operator, making the index thereon readily discernible. This beam C' is connected to the main beam C by the brackets $b$, located one at either end of said main beam, so that the tare-beam extends the entire length of the main beam, and is consequently directly in front of the operator. On the inclined surface, toward the front of the beam, is stamped the index representing pounds, the purpose of this beam being to weigh the wagon, cart, or other receptacle. On this beam C' is located a sliding weight, D, having preferably a V-shaped opening, $d$, the angle formed by the upper sides of said opening being equal to the angle of the beam C'. In one side of the weight D is formed the pointer $d'$. The shape of the beam C' and the opening $d$ in the weight always insure accuracy of said weight, as, no matter how much the wear may be, the weight always rests firmly on the beam and cannot tilt or rock. A set-screw, D', passes through the lower portion of the weight D and into the opening $d$, by which the weight may be secured in any desired position on the beam.

In front of the main beam C are located the index-beam C³ and the light-weight beam C², both of said beams being connected to the main beam by the brackets $b'$. The beam C² is preferably in the form of a rod, as shown, upon which is located the sliding weight E. The index-beam C³ consists of a vertical bar, F, preferably made of steel, and an inclined plate, F', upon which latter plate is stamped the main index of weights, both for pounds and bushels. The weight E is provided with a surrounding collar, $e$, in which is formed a notch, $e'$, which latter engages with the lower edge of plate F', upon which lower edge is stamped the particular index for the weight E, the collar $e$ on said weight serving as a pointer. In the upper edge of the bar F are formed a series of notches, $f$, which represent pounds, and another series of notches which represent bushels, and each of these notches has one side—preferably that side which is toward the fulcrum—vertical, the other side of said notch being inclined. Directly under each of these notches, and on the plate F', is stamped the index indicating its position in the scale of pounds or bushels.

The upper edge of the main beam C is made V-shaped, and upon this beam is located the main weight G, which is capable of sliding on said beam. In the lower side of this weight G is formed the recess or opening $g$, which extends the entire length of the weight, and which is located a little to one side of the vertical longitudinal center of the weight, so that the portion $h$ at the front side of the weight is heavier than the portion $h'$ at the back of said weight. This recess is made somewhat wider than the thickness of the beam C, and its roof is preferably concave, so that it only rests upon the beam C at either end. The roof of the recess $g$ is made V-shaped, the angle formed being more obtuse than the upper edge of the beam C, upon which the weight G rests and slides. From that side of the weight G which is next to the index-beam $C^3$ projects a lug, H, the lower edge of which is beveled, and is capable of fitting into either of the notches $f f'$, into which it may be placed by sliding the weight G on the beam C. On top of the weight G is a knob or handle, I, by which the weight is manipulated. When it is desired to move the weight G on the beam this weight is rocked on the upper edge of the beam until the lug H is freed from the notches in the bar F, when the weight may be slid to the desired position, and the lug is then allowed to enter another of the notches in said bar, the shape of the notches and the lower edge of the lug, as above described, always insuring perfect accuracy of position, the heavy portion $h$ of the weight always keeping the lug securely in the notches and against the vertical face of the latter until it is desired to move the weight.

To the short arm of the main beam is connected the adjustable end J, from which is suspended the counterbalance-weight K for balancing the beam. This end J is made adjustable on the beam, so that the center of gravity of the beam may be slightly varied to insure more perfect accuracy of the beam. To the end J is also connected the rod L, on which is located the usual adjustment-weight, M. The rod N is suspended from the short arm of the beam by the stirrup O, and this rod N establishes connection between the scale-beam and platform.

The manner in which my invention, as above described, is operated is as follows, supposing it to be constructed for weighing coal: The wagon or cart to be loaded is driven onto the platform and its weight taken by the weight D on the tare-beam C', after which it is loaded. As an ordinary cart-load of coal is twenty-five bushels, the weight E on the light-weight beam $C^2$ is preferably just sufficiently heavy when moved to the end of the beam to balance twenty-five bushels of coal, so that when this sized-load is to be weighed it is only necessary to use the weight E; but if it is desired to weigh a larger number of bushels than twenty-five, then the weight G must be used, and it is to be moved to the bushel-notch $f'$ of the index-beam, which represents the number of bushels desired to be weighed. The bushel-scale for the weight E is graded from one to twenty-five, and the bushel-notches in the index-beam are placed at twenty-five bushels, or multiples thereof, and by this means any desired number of bushels may be weighed up to the full capacity of the scales. If, now, it is desired to weigh by pounds instead of bushels, the bushel-notches in the index-beam and the bushel-index for the weight E must be ignored and the pound-notches and index used instead, the operation of weighing being similar in both instances.

It will thus be seen that I am enabled to readily weigh pounds or bushels on the same beam, and when bushels are to be weighed there will be no necessity of a mathematical calculation to arrive at the desired result.

The various beams being directly in front of the operator and the indexes being on inclined surfaces, the weights and measures are very easily read off by the operator, and the particular configuration of the various weights and beams always insures perfect accuracy.
It will be obvious that the beam may be constructed for weighing bushels of wheat, corn, or other grain by simply arranging the bushel-notches in the bar F at the proper intervals, and when so constructed it will fall within the scope of my invention.

Various features of my invention may be used independently of the other features—as, for instance, the tare-beam may be omitted.

What I claim as new and of my invention, and desire to secure by Letters Patent, is—

1. The index-beam $C^3$, consisting of a vertical plate, F, and an inclined plate, F', in combination with the weights G and E, properly supported, the plate F' being provided with indexes for said weights, substantially as and for the purposes specified.

2. The index-beam $C^3$, having an inclined plate, F', in combination with weight G at its upper edge and weight E at its lower edge, substantially as and for the purposes specified.

3. The weight G, provided with a longitudinal recess, located at one side of the longitudinal vertical center, and resting and sliding on the main beam C, in combination with the index-beam $C^3$, located at one side of said main beam, the weight being provided with a lug, H, adapted to rest on the upper edge of the index-beam, substantially as and for the purposes specified.

4. The combination of the index-beam $C^3$, provided with notches $f f'$, each having a vertical face and an inclined face, in combination with the weight G, resting on the beam C, and provided with the lug H, having a beveled lower edge to engage with said notches, substantially as and for the purposes specified.

5. The scale-beam B, constructed substantially as described, in combination with the adjustable end J, having connected thereto the counterbalance-weight L and the adjustment-weight K, substantially as and for the purposes specified.

ISAAC RIGDON.

Witnesses:
A. S. LUDLOW,
W. P. GULICK.